United States Patent
Gugenberger

(10) Patent No.: US 10,030,775 B2
(45) Date of Patent: Jul. 24, 2018

(54) SEALING RING AND PRESSURE MEASURING TRANSDUCER HAVING AT LEAST ONE SUCH SEALING RING

(71) Applicant: Endress + Hauser GmbH + Co. KG, Maulburg (DE)

(72) Inventor: Alexander Gugenberger, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 533 days.

(21) Appl. No.: 14/442,528

(22) PCT Filed: Oct. 28, 2013

(86) PCT No.: PCT/EP2013/072500
§ 371 (c)(1),
(2) Date: May 13, 2015

(87) PCT Pub. No.: WO2014/075903
PCT Pub. Date: May 22, 2014

(65) Prior Publication Data
US 2016/0290508 A1    Oct. 6, 2016

(30) Foreign Application Priority Data
Nov. 15, 2012 (DE) ........................ 10 2012 111 001

(51) Int. Cl.
*G01L 7/00* (2006.01)
*F16J 15/12* (2006.01)
*G01L 9/00* (2006.01)

(52) U.S. Cl.
CPC ........... *F16J 15/121* (2013.01); *F16J 15/127* (2013.01); *G01L 9/0072* (2013.01); *G01L 9/0075* (2013.01)

(58) Field of Classification Search
None
See application file for complete search history.

(56) References Cited

U.S. PATENT DOCUMENTS

| 2,330,425 A | 9/1943 | Hilton |
| 3,330,568 A | 7/1967 | Wetzel |
| (Continued) | | |

FOREIGN PATENT DOCUMENTS

| CN | 1987165 A | 6/2007 |
| CN | 202158184 U | 3/2012 |
| (Continued) | | |

OTHER PUBLICATIONS

English Translation of the International Preliminary Report on Patentability, WIPO, Geneva, May 19, 2015.
(Continued)

*Primary Examiner* — Peter Macchiarolo
*Assistant Examiner* — Jermaine Jenkins
(74) *Attorney, Agent, or Firm* — Bacon & Thomas, PLLC

(57) ABSTRACT

A ring arrangement with a synthetic material sealing ring between an outer radial guiding ring and an inner radial guiding ring, wherein the outer guiding ring has a greater coefficient of thermal expansion than the inner guiding ring, so that an effective volume expansion coefficient of an annular gap between the guiding rings is greater than the volume expansion coefficient of the synthetic material of the synthetic material sealing ring. Through a large effective coefficient of thermal expansion for the annular gap volume, as achieved via different coefficients of expansion of the outer and inner guiding rings, fluctuation of the axial clamping forces of the synthetic material sealing ring can be limited.

13 Claims, 3 Drawing Sheets

(56) References Cited

U.S. PATENT DOCUMENTS

| | | | | |
|---|---|---|---|---|
| 3,467,448 | A | * | 9/1969 | Galle .................. E21B 10/25 175/372 |
| 3,869,132 | A | | 3/1975 | Taylor et al. |
| 4,321,578 | A | * | 3/1982 | Nagasu ................ G01L 13/025 338/4 |
| 5,842,701 | A | * | 12/1998 | Cawthorne ............ E21B 10/25 277/336 |
| 6,122,976 | A | * | 9/2000 | Hallberg ............... C03C 27/044 73/756 |
| 6,305,483 | B1 | * | 10/2001 | Portwood ............. E21B 10/25 175/371 |
| 6,612,177 | B2 | * | 9/2003 | Boehler ............... G01L 9/0075 73/706 |
| 6,863,278 | B2 | | 3/2005 | Morvant |
| 8,459,124 | B2 | * | 6/2013 | Wang ................... G01L 9/0055 73/700 |
| 8,925,388 | B2 | | 1/2015 | Hugel |
| 9,027,410 | B2 | * | 5/2015 | Hop .................... G01L 19/04 73/706 |
| 9,239,251 | B2 | | 1/2016 | Lopatin et al. |
| 2011/0180887 | A1 | * | 7/2011 | Rothacher ............ B81B 7/0041 257/415 |
| 2016/0054191 | A1 | * | 2/2016 | Rossberg ............. G01L 9/0072 73/708 |
| 2017/0138808 | A1 | * | 5/2017 | Tham .................. G01L 13/025 |

FOREIGN PATENT DOCUMENTS

| | | |
|---|---|---|
| DE | 7401602 U | 4/1974 |
| DE | 102010038986 A1 | 2/2012 |
| DE | 10223588 B4 | 8/2013 |
| EP | 1710545 A1 | 11/2006 |
| FR | 1443193 | 5/1966 |
| GB | 1134096 | 11/1968 |
| JP | 01261564 A | 10/1989 |
| JP | H06265025 A | 9/1994 |
| JP | 2004186329 A | 7/2004 |
| WO | 2009029878 A1 | 3/2009 |
| WO | 2011154209 A1 | 12/2011 |

OTHER PUBLICATIONS

International Search Report, EPO, The Netherlands, Mar. 21, 2014.
German Search Report, German PTO, Aug. 27, 2013.

* cited by examiner

SEALING RING AND PRESSURE MEASURING TRANSDUCER HAVING AT LEAST ONE SUCH SEALING RING

TECHNICAL FIELD

The present invention relates to a sealing ring and a pressure measuring transducer having at least one such sealing ring.

BACKGROUND DISCUSSION

The process industry works at times with media, which established elastomers can only conditionally withstand. It is, consequently, usual, in the case of media-contacting seals not to use otherwise usual elastomers, in case such media can be expected. Instead, metal seals or inert synthetic materials, especially fluoropolymers, such as, for example, PTFE, FEP or PFA, are applied. Designs of the components to be sealed relative to one another must then be adapted to the special properties of the sealing materials. Thus, for example, metal seals require, as a rule, large clamping forces, in order to generate the required compressive pressures, and fluoropolymer seals must be elastically prestressed, in order to be able to overcome thermal expansion differences between the, usually, metal sealing partners and the seal itself, thermal stresses in the structure, loosening of screwed joints and, in given cases, hysteresis phenomena associated with the aforementioned effects as well as flow of the sealing material and manufacturing tolerances.

A problem for industrial process measurements technology resulting from this picture is that measuring devices should be suitable for the most varied of process media using an as small as possible number of variants as regards construction. Since, most often, elastomeric seals suffice, it is not justified to provide all devices with such complex construction that they can sufficiently elastically prestress thermoplastic seals.

The yet unpublished German patent application, DE 10 2012 004 406, discloses a metal sealing ring having a z-shaped cross section, wherein the sealing surfaces on the end faces of the sealing ring are coated with a polymer, especially PTFE. The z-shaped cross section effects an axial elasticity of the sealing ring, with which the sealing surfaces can be axially prestressed. The described metal sealing ring leads, however, to temperature dependent fluctuations of the axial clamping forces. Additionally, the manufacturing of the metal sealing ring is expensive.

SUMMARY OF THE INVENTION

It is, consequently, an object of the present invention to provide a new sealing ring and a pressure measuring transducer with such a sealing ring, which has chemically resistant materials and alleviates the effects of large thermal expansion of organic materials.

The object is achieved by a sealing ring as defined in independent patent claim 1 and the pressure measuring transducer as defined in independent patent claim 11. The sealing ring of the invention for sealing in an axially clamped state which includes: an annular sealing element of a first material having a first linear coefficient of thermal expansion $\alpha_1$; an annular guiding arrangement, which defines at least one radial barrier for an equatorial annular surface of a volume consumable by the sealing element, wherein the equatorial annular surface has an effective area thermal expansion coefficient $\beta$, which amounts to more than twice, especially not less than two and a half times, the first linear coefficient of thermal expansion, so that an effective axial coefficient of thermal expansion of the annular sealing element is less than the first linear coefficient of thermal expansion, especially amounts to no more than half the first linear coefficient of expansion, preferably no more than 30 ppm/K, and especially preferably no more than 20 ppm/K.

In a further development of the invention, the guiding arrangement includes an inner radial guiding ring, wherein the inner guiding ring has an inner radial bounding surface for the sealing element, wherein the inner guiding ring comprises a second material having a second linear coefficient of thermal expansion $\alpha_2$, wherein the guiding arrangement further includes an outer radial guiding ring, wherein the outer guiding ring has an outer radial bounding surface for the sealing element, wherein the outer guiding ring comprises a third material having a third linear coefficient of thermal expansion $\alpha_3$, wherein the second coefficient of thermal expansion $\alpha_2$ is less than the third coefficient of thermal expansion $\alpha_3$.

In a further development of the invention, the third coefficient of thermal expansion $\alpha_3$ is less than the first coefficient of thermal expansion $\alpha_1$, wherein an effective outer radius $R_o$ of the outer bounding surface and an effective inner radius $R_i$ of the inner bounding surface are so selected that the following relationship is fulfilled as much as possible over a desired temperature range of use:

$$[(R_o \cdot F_3)^2 - (R_i \cdot F_2)^2] \cdot F_3 = [R_o^2 - R_i^2] \cdot F_1^3 \quad (I)$$

In such case, the $F_i$ equal $(1+\alpha_i \cdot \Delta T)$, wherein $\Delta T$ is the deviation from a reference temperature $T_0$, for example, $T_0=300$ K. Taking into consideration the fact that the thermal expansion term $\alpha_i \cdot \Delta T$ R is significantly less than 1, the following equation then holds for the ratio of the radii:

$$\frac{R_a}{R_i} - 1 = K \cdot \left[ \sqrt{\frac{\alpha_1 - \frac{2}{3}\alpha_2 - \frac{1}{3}\alpha_3}{\alpha_1 - \alpha_3}} - 1 \right], \quad (II)$$

wherein $0.67<K<1.5$ especially $0.8<K<1.25$, preferably $0.9<K<1.1$ and especially preferably $0.95<K<1.05$.

In a further development of the invention, the second material comprises a ceramic material or glass, wherein the second coefficient of thermal expansion $\alpha_2$ amounts to, for example, no more than 8 ppm/K, especially no more than 5 ppm/K, and preferably no more than 3.5 ppm/K.

In a further development of the invention, the third material comprises a metal material, especially stainless steel, wherein the third coefficient of thermal expansion $\alpha_3$ amounts to, for example, not less than 14 ppm/K, especially not less than 15 ppm/K, and preferably not less than 16 ppm/K.

In a further development of the invention, the first material comprises a polymer, wherein the first coefficient of thermal expansion $\alpha_1$ amounts to, for example, not less than 80 ppm/K and no more than 200 ppm/K, especially no more than 150 ppm/K. In an embodiment, the first material comprises a fluoropolymer, especially PTFE or PFA.

In a further development of the invention, the first material comprises an elastomer, wherein the guiding arrangement includes an inner radial guiding ring, wherein the inner guiding ring has an inner radial bounding surface for the sealing element, wherein the inner guiding ring comprises a second material having a second linear coefficient of thermal expansion $\alpha_2$, which is less than the first linear coefficient of thermal expansion $\alpha_1$, wherein the sealing ring is specified for a temperature range up to a maximum temperature $T_{max}$, wherein the inner guiding ring prestresses the sealing element radially, such that the sealing element bears against a sealing surface at least up to a temperature of temperature $T_{max}$–20 K, preferably up to $T_{max}$.

The object is also achieved by a pressure measuring transducer of the invention which includes: a pressure sensor having a pressure sensor body, which includes at least a first pressure receiving surface, which is contactable with a first pressure, wherein the pressure sensor body further includes at least a first sealing surface, which annularly surrounds the first pressure receiving surface, and a transducer for providing a signal, which depends on a difference between a first pressure present on the pressure receiving surface and a reference pressure; at least a first connecting body, which includes a first pressure opening and a first opposing sealing surface, wherein the first opposing sealing surface annularly surrounds the first pressure opening; and at least a first sealing ring of the invention, wherein the first sealing ring is axially clamped sealingly between the first sealing surface and the first opposing sealing surface, so that the first pressure receiving surface is contactable through the first pressure opening with a first pressure.

In a further development of the invention, the process connection body and the sensor body each comprise a metal material, especially a material whose coefficient of thermal expansion deviates by no more than 4 ppm/K, preferably no more than 2 ppm/K, from that of the third material of the sealing ring of the invention.

In a further development of the invention, an axial separation is provided between the first sealing surface and the first opposing sealing surface, which has an effective linear coefficient of thermal expansion, which deviates by no more than 8 ppm/K, preferably no more than 4 ppm/K, and especially preferably no more than 2 ppm/K from the effective axial coefficient of thermal expansion of the annular sealing element.

In a further development of the invention, the pressure measuring transducer is an absolute- or relative pressure measuring transducer, wherein the reference pressure comprises vacuum pressure, respectively atmospheric pressure.

In another further development of the invention, the pressure measuring transducer is a pressure difference transducer, wherein the pressure sensor body has, additionally, a second pressure receiving surface, which is contactable with a second pressure, wherein the pressure sensor body has further a first second sealing surface, which annularly surrounds the second pressure receiving surface, wherein the transducer serves for providing a signal, which depends on a difference between a first pressure present on the first pressure receiving surface and a reference pressure present on the second pressure surface; wherein the pressure difference transducer further includes a second pressure opening in a connecting body and a second opposing sealing surface, wherein the second opposing sealing surface annularly surrounds the second pressure opening; and wherein the pressure difference transducer further includes a second sealing ring of the invention, wherein the second sealing ring is axially clamped sealingly between the second sealing surface and the second opposing sealing surface, so that the second pressure receiving surface is contactable through the second pressure opening with a second pressure as reference pressure.

The second pressure opening and the second opposing sealing surface are arranged according to a further development of the invention on the first connecting body coplanarly with the first pressure opening and with the first opposing sealing surface.

In another further development of the invention, the pressure difference transducer includes a second connecting body, which has the second pressure opening and the second opposing sealing surface, wherein the sensor body is axially clamped between the first connecting body and the second sensor body.

BRIEF DESCRIPTION OF THE DRAWINGS

The invention will now be explained based on examples of embodiments presented in the drawing, the figures of which show as follows.

DETAILED DISCUSSION IN CONJUNCTION WITH THE DRAWINGS

Figure 1:
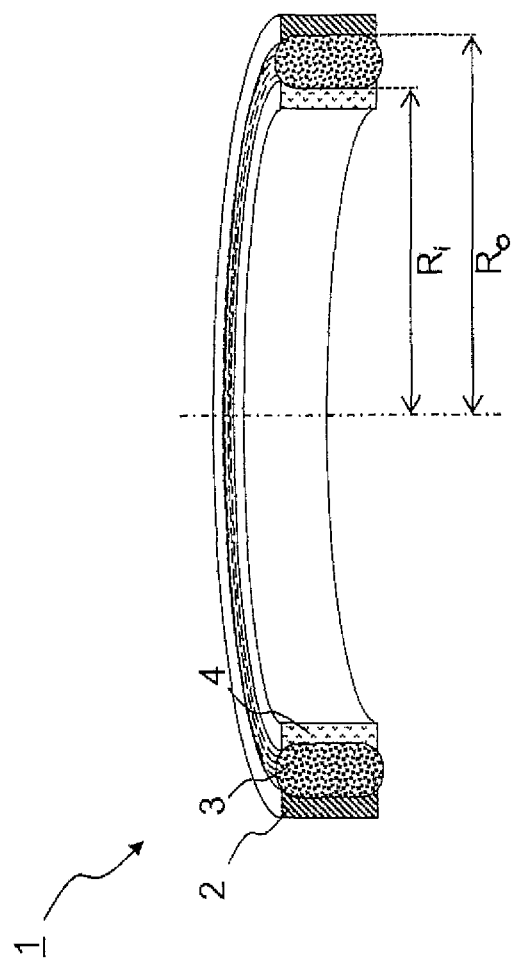
FIG. 1 is a longitudinal section through an example of an embodiment of a sealing ring of the invention.

The sealing ring 1 shown in FIG. 1 for sealing in an axially clamped state includes an outer guiding ring 2, an annular sealing element 3, and an inner guiding ring 4, wherein the outer guiding ring 2 and the inner guiding ring 4 form a guiding arrangement for the sealing element 3. The sealing element comprises a polymer, especially a fluoropolymer, which, indeed, has excellent media resistance, but can, however, be mechanically, respectively thermomechanically, insufficient. Thus, on the one hand, it can flow, or creep, under strong compressive loading, and, on the other hand, it has a large first coefficient of thermal expansion $\alpha_1$, for example, around 100 ppm/K.

The guiding arrangement, however, provides by the two guiding rings two annular radial barriers, between which the flowability, respectively flexibility, of the fluoropolymer becomes an advantage. The inner guiding ring 4 is composed of a material having a second linear coefficient of thermal expansion $\alpha2$, which is less than a third linear coefficient of thermal expansion $\alpha_3$ of a third material, of which the outer guiding ring 2 is built. In practice, for example, a stainless steel of type 1.4435 can be used for the outer guiding ring 2, so that the third linear coefficient of thermal expansion $\alpha_3$ then amounts to, for instance, 17.5 ppm/K. Used as material for the inner guiding ring 4 can be, for example, a borosilicate glass (Borofloat), so that the second linear coefficient of thermal expansion $\alpha_2$ amounts to, for instance, 3.25 ppm/K.

A cross sectional area A of the sealing element 3 in a central plane of the sealing ring 1 is then given as $A = \text{pi} \ast (R_o^2 - R_i^2)$, wherein $R_o$ is the outer radius of the sealing element 3 bounded by the outer guiding ring 2, and wherein $R_i$ is the inner radius of the sealing element 3 bounded by the inner guiding ring 4.

With the above materials, it then follows with the above equation (II) and K=1 as dimensional specification at reference temperature that $R_o/R_i = 1.056$. When thus, for example, the inner radius $R_i$ of the sealing element 3, which is given by the outer radius of the inner guiding ring 4, has, for example, a value of 15 mm, then the outer radius $R_o$ of the sealing element 3, which is defined by the inner radius of the outer guiding ring 2, amounts to 15.84 mm. The sealing element 3 fills thus an annular gap of 0.8 mm.

In this case, then the effective axial expansion coefficient of the sealing element 3 corresponds to the third linear coefficient of expansion $\alpha_3$ of the outer guiding ring 2. An axial swelling of the sealing element 3 with reference to the outer guiding ring 2 is therewith largely avoided.

The sealing ring of the invention can be applied advantageously in pressure measuring transducers.

Figure 2:
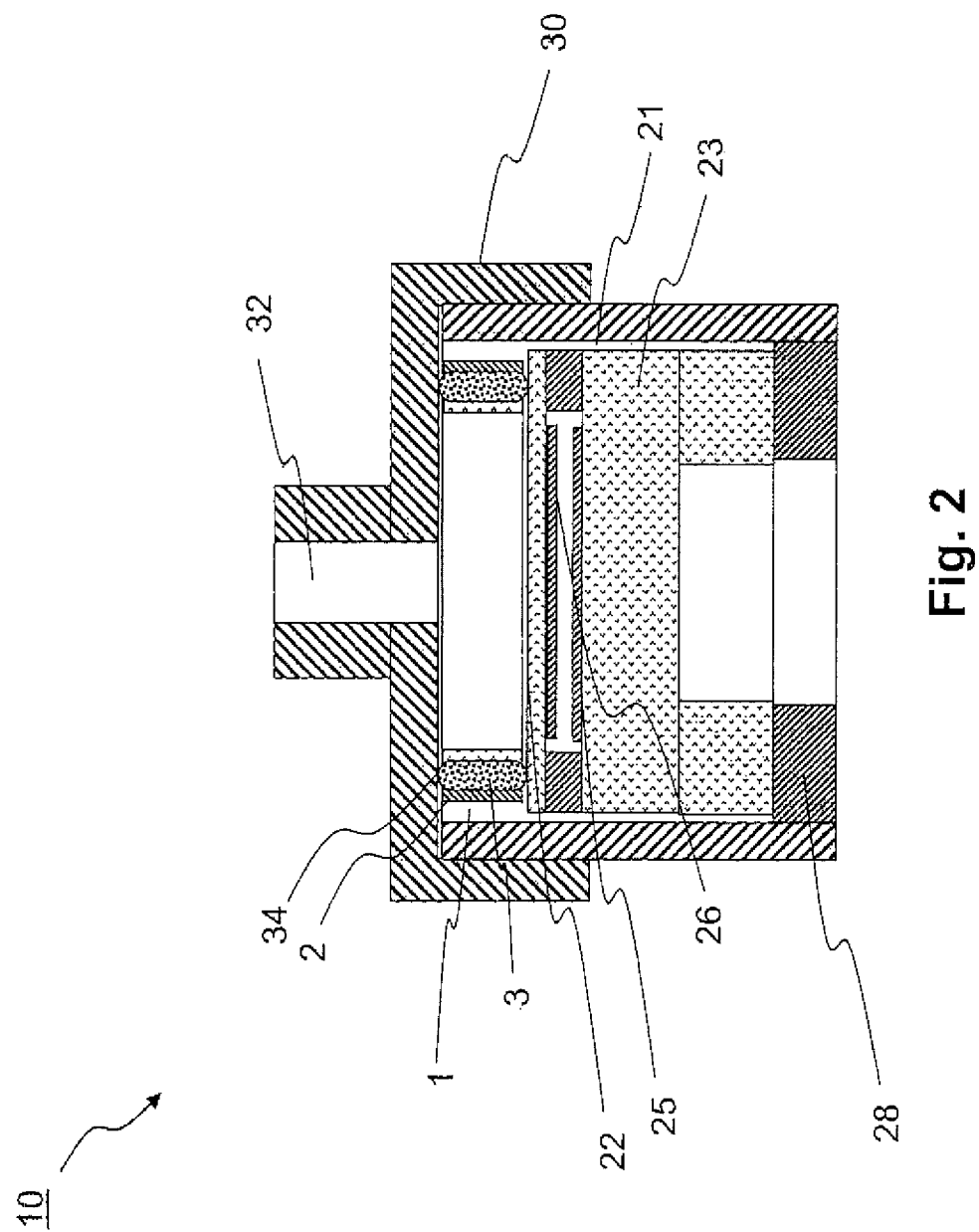
FIG. 2 is a longitudinal section through an example of an embodiment of an absolute pressure transducer of the invention.

The absolute pressure measuring transducer 10 shown in FIG. 2 includes in a metal cylindrical housing 20 a ceramic pressure measuring cell 21, which, for example, forms a sensor body in the sense of the invention. Pressure measuring cell 21 includes a measuring membrane 22 and a platform 23, wherein the measuring membrane 22 is connected terminally with the platform. The pressure measuring cell includes a capacitive transducer for registering a pressure-dependent deformation of the measuring membrane, wherein the capacitive transducer includes at least a first electrode 25 on the measuring membrane 22 and at least a second electrode 26 on a platform 23, wherein the two electrodes are facing one another. Pressure measuring cell 21 is axially clamped in the housing 20 with a terminally supported clamping ring 28 and the measuring membrane 22 faces a connecting body 30, which is screwed on to the housing 20. Connecting body 30 includes a central axial bore 32, which forms a pressure inlet opening, through which the measuring membrane 22 is contactable with a pressure. Between the measuring membrane 22, which thus forms a pressure receiving surface, and the connecting body 30, a sealing ring of the invention 1 is axially clamped, wherein the sealing ring 1 bears against an edge region of the measuring membrane 22 supported by a joint between the measuring membrane 22 and the platform 23, which edge region forms a sealing surface, and wherein an annular surface region of the connection body 30 lying opposite the sealing surface forms an opposing sealing surface. The sealing element 3 of the sealing ring 1, which comprises a fluoropolymer, has the same effective axial thermal expansion as the outer guiding ring 2 of stainless steel. This largely prevents thermal swelling or shrinking of the sealing element 3 relative to the outer guiding ring 2, whereby the sealing action of the sealing ring 1 is maintained long term.

Figure 3:
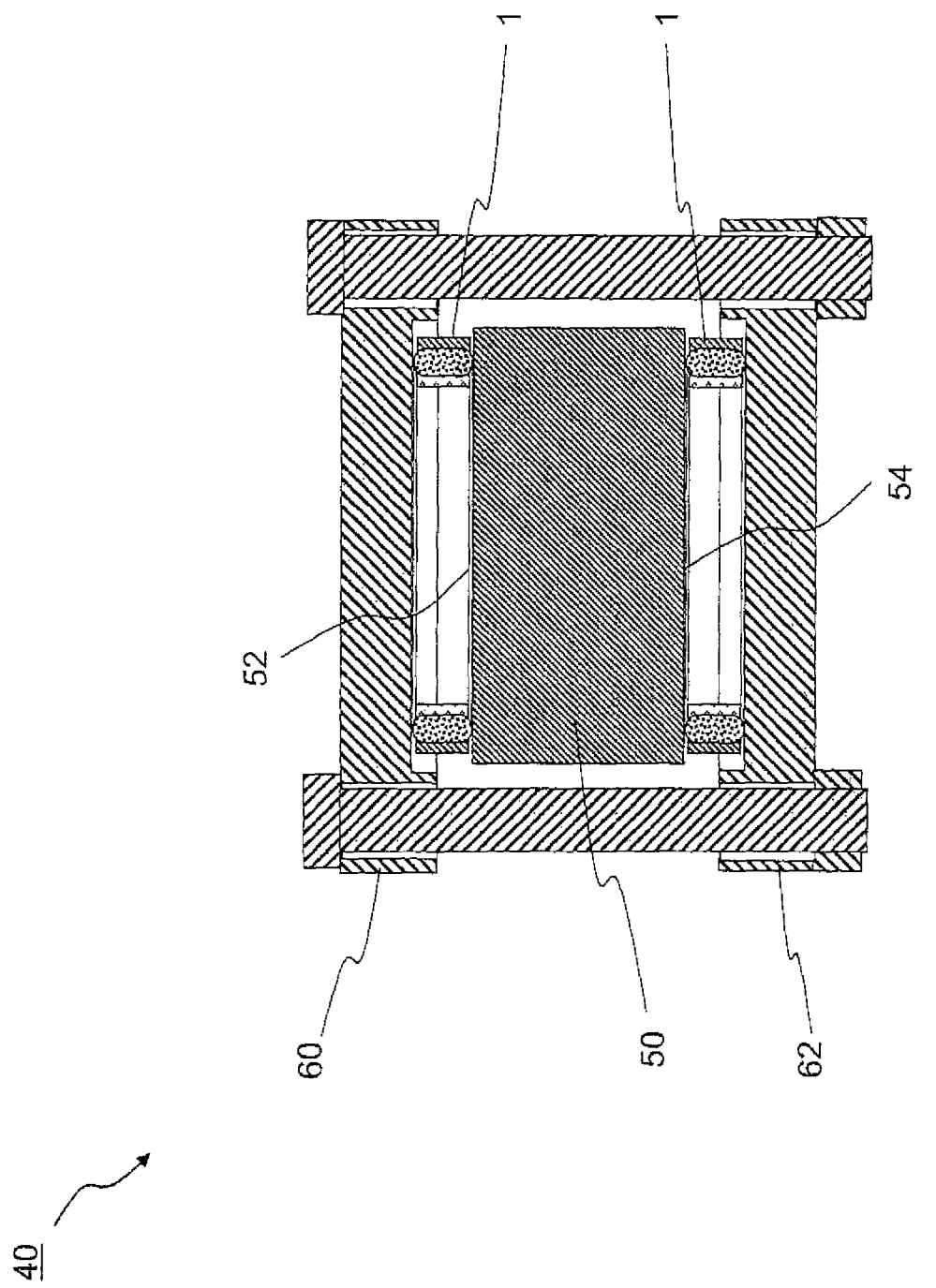
FIG. 3 is a schematic longitudinal section through an example of an embodiment of a pressure difference measuring transducer of the invention.

The example of an embodiment of a pressure difference measuring transducer 40 shown in FIG. 3 includes a cylindrical sensor body 50 having a first end 52 and a second end 54, wherein the sensor body 50 is axially clamped between two process connection flanges 60, 62. Axially clamped between the process connection flanges and the two end faces 52, 54 is, in each case, a sealing ring 1 of the invention. The region of the end faces surrounded by the sealing rings 1 includes, in each case, an isolating diaphragm (not shown), which forms a pressure receiving surface, wherein the pressure in the interior of the sensor body acting on the isolating diaphragm is transmitted hydraulically to a pressure difference measuring transducer (not shown), whose signal depends on a difference between a first pressure present on the first end 52 and a second pressure present on the second end 54. The two process connection flanges 60, 62 have, in each case, a pressure opening (not shown), through which, in each case, a pressure is suppliable into a space formed between the sealing ring 1, the process connection flange and the sensor body.

The invention claimed is:

1. A sealing ring for sealing in an axially clamped state, comprising:

an annular sealing element of a first material having a first linear coefficient of thermal expansion; and an annular guiding arrangement, which defines at least one radial barrier for an equatorial annular surface of a volume consumable by said sealing element, wherein:

said equatorial annular surface has an effective area thermal expansion coefficient, which amounts to more than twice, and not less than two and a half times, said first linear coefficient of thermal expansion, so that an effective axial coefficient of thermal expansion of said annular sealing element is less than said first linear coefficient of thermal expansion, and no more than half said first linear coefficient of thermal expansion, preferably amounts to no more than 30 ppm/K, and still preferably no more than 20 ppm/K, said annular guiding arrangement has an inner radial guiding ring, which has an inner radial bounding surface for the sealing element;

said inner guiding ring comprises a second material having a second linear coefficient of thermal expansion $\alpha_2$;

said annular guiding arrangement further includes an outer radial guiding ring, which has an outer radial bounding surface for said annular sealing element;

said outer radial guiding ring comprises a third material having a third linear coefficient of thermal expansion $\alpha_3$; and said second coefficient of thermal expansion $\alpha_2$ is less than said third coefficient of thermal expansion $\alpha_3$.

2. The sealing ring as claimed in claim 1, wherein:

said third coefficient of thermal expansion $\alpha_3$ is less than said first coefficient of thermal expansion $\alpha_1$; and between an effective outer radius of the outer radius bounding surface and an effective inner radius of the inner radius bounding surface the following relationship holds:

$$\frac{R_o}{R_i} - 1 = K \cdot \left[ \sqrt{\frac{\alpha_1 - \frac{2}{3}\alpha_2 - \frac{1}{3}\alpha_3}{\alpha_1 - \alpha_3}} - 1 \right]$$

wherein $0.67 < K < 1.5$ especially $0.8 < K < 1.25$, preferably $0.9 < K < 1.1$ and especially preferably $0.95 < K < 1.05$.

3. The sealing ring as claimed in claim 1, wherein:

said second material comprises a ceramic material or glass; and/or said second coefficient of thermal expansion $\alpha_2$ amounts to no more than 8 ppm/K, especially no more than 5 ppm/K, and preferably no more than 3.5 ppm/K.

4. The sealing ring as claimed in claim 1, wherein:

said third material comprises a metal material, especially stainless steel; and/or said third coefficient of thermal expansion $\alpha_3$ amounts to not less than 14 ppm/K, especially not less than 15 ppm/K, and preferably not less than 16 ppm/K.

5. The sealing ring as claimed in claim 4, wherein:

said first material comprises a fluoropolymer, especially PTFE or PFA.

6. The sealing ring as claimed in claim 1, wherein:

said first material comprises a polymer; and/or said first coefficient of thermal expansion $\alpha_1$ amounts to not less than 80 ppm/K and no more than 200 ppm/K, especially no more than 150 ppm/K.

7. A pressure measuring transducer, comprising:
a pressure sensor having a pressure body, which includes at least a first pressure receiving surface, which is contactable with a first pressure, and at least a first sealing surface, which annularly surrounds said at least a first receiving surface, and a transducer for providing a signal, which depends on a difference between said first pressure present on said at least a first pressure receiving surface and a reference pressure;
at least a first connecting body, which includes a first pressure opening and a first opposing sealing surface, said first opposing sealing surface surrounds said first pressure opening annularly; and
at least a first sealing ring, comprising: an annular sealing element of a first material having a first linear coefficient of thermal expansion; and an annular guiding arrangement, which defines at least one radial barrier for an equatorial annular surface of a volume comsumable by said sealing element, wherein said equatorial annular surface has an effective area thermal expansion coefficient, which amounts to more than twice, and not less than two and a half times, said first linear coefficient of thermal expansion, so that an effective axial coefficient of thermal expansion of said annular sealing element is less than said first linear coefficient of thermal expansion, and no more than half said first linear coefficient of thermal expansion, preferably amounts to no more than 30 ppm/K, and still preferably no more than 20 ppm/K, wherein:
said first sealing ring is axially clamped sealingly between said first sealing surface and said first opposing sealing surface, so that said first pressure receiving surface is contactable with a first pressure through said first pressure opening;
said annular guiding arrangement has an inner radial guiding ring, which has an inner radial bounding surface for said sealing element;
said inner radial guiding ring comprises a second material having a second linear coefficient of thermal expansion;
an outer radial guiding ring, which has an outer radial bounding surface for said annular sealing element, said outer radial guiding ring comprises a third material having a third linear coefficient of thermal expansion; and
said second coefficient of thermal expansion is less than said third coefficient of thermal expansion.

8. The pressure measuring transducer as claimed in claim 7, wherein:
said first connecting body and said pressure body each comprise a metal material, especially a material whose coefficient of thermal expansion deviates by no more than 4 ppm/K, preferably no more than 2 ppm/K, from that of the third material of the sealing ring of the invention.

9. The pressure measuring transducer as claimed in claim 7, wherein:
an axial separation is provided between said first sealing surface and said first opposing sealing surface, which has an effective linear coefficient of thermal expansion, which deviates by no more than 8 ppm/K, preferably no more than 4 ppm/k, and especially preferably no more than 2 ppm/k, from the effective axial coefficient of thermal expansion of said annular sealing element.

10. The pressure measuring transducer as claimed in claim 7, which is an absolute- or relative pressure measuring transducer, wherein:
the reference pressure comprises vacuum pressure, respectively atmospheric pressure.

11. The pressure measuring transducer as claimed in claim 7, which is a pressure difference transducer, wherein:
said pressure body has, additionally, a second pressure receiving surface, which is contactable with a second pressure;
said pressure body has further a second sealing surface, which annularly surrounds said second pressure receiving surface;
the transducer serves for providing a signal, which depends on a difference between the first pressure present on said first pressure receiving surface and the reference pressure present on said second pressure surface;
the pressure difference transducer further includes a second pressure opening in a connecting body and a second opposing sealing surface;
said second opposing sealing surface annularly surrounds said second pressure opening; and
the pressure difference transducer further includes a second sealing ring for sealing in an axially clamped state, comprising: an annular sealing element of a first material having a first linear coefficient of thermal expansion; and an annular guiding arrangement, which defines at least one radial barrier for an equatorial annular surface of a volume consumable by said sealing element, wherein: said equatorial annular surface has an effective area thermal expansion coefficient, which amounts to more than twice, and not less than two and a half times, said first linear coefficient of thermal expansion, so that an effective axial coefficient of thermal expansion of said annular sealing element is less than said first linear coefficient of thermal expansion, and no more than half said first linear coefficient of expansion, preferably amounts to no more than 30 ppm/K, and still preferably no more than 20 ppm/K;
said second sealing ring is axially clamped sealingly between said second sealing surface and said second opposing sealing surface, so that said second pressure receiving surface is contactable through said second pressure opening with a second pressure as a reference pressure.

12. The pressure difference transducer as claimed in claim 11, wherein:
said second pressure opening and said second opposing sealing surface are arranged on said first connecting body coplanarly with said first pressure opening and said first opposing sealing surface.

13. The pressure difference transducer as claimed in claim 11, which further includes:
a second connecting body, which has said second pressure opening and said second opposing sealing surface, wherein:
said pressure body is axially clamped between said first connecting body and said second pressure body.

* * * * *